United States Patent
Åström (10) Patent No.: US 9,455,466 B2
(45) Date of Patent: Sep. 27, 2016

(54) METHOD AND ARRANGEMENT FOR IMPROVED CONTROLLABILITY OF FUEL CELL STACKS

(75) Inventor: Kim Åström, Kirkkonummi (FI)

(73) Assignee: CONVION OY, Espoo (FI)

( * ) Notice: Subject to any disclaimer, the term of this patent is extended or adjusted under 35 U.S.C. 154(b) by 795 days.

(21) Appl. No.: 13/346,497

(22) Filed: Jan. 9, 2012

(65) Prior Publication Data

US 2012/0175959 A1    Jul. 12, 2012

Related U.S. Application Data

(63) Continuation of application No. PCT/FI2010/050440, filed on May 31, 2010.

(30) Foreign Application Priority Data

Jul. 8, 2009    (FI) ..................................... 20095775

(51) Int. Cl.
    *H02J 1/00*     (2006.01)
    *H02J 3/00*     (2006.01)
    (Continued)

(52) U.S. Cl.
    CPC ........... *H01M 8/249* (2013.01); *H01M 8/0488* (2013.01); *H01M 8/0491* (2013.01); *H01M 8/04559* (2013.01); *H01M 8/04589* (2013.01);
    (Continued)

(58) Field of Classification Search
    CPC ......... H01M 8/249; H01M 8/04537–8/04567; H01M 8/04858–8/04888; H02J 2007/0067; H02J 7/0063–7/0065; Y10T 307/685; Y10T 307/702

USPC ................ 363/65; 307/82, 77, 151; 320/118
See application file for complete search history.

(56) References Cited

U.S. PATENT DOCUMENTS 8,058,752 B2 * 11/2011 Erickson et al. ............. 307/150
8,288,991 B2    10/2012 Sardat et al.
(Continued)

FOREIGN PATENT DOCUMENTS

FI             118553 B     12/2007
JP        2005-150023 A     6/2005
(Continued)

OTHER PUBLICATIONS

Office Action issued on Apr. 8, 2014, by the Japanese Patent Office in corresponding Japanese Patent Application No. 2012-519027, and an English Translation of the Office Action. (15 pages).
(Continued)

*Primary Examiner* — Carlos Amaya
(74) *Attorney, Agent, or Firm* — Buchanan Ingersoll & Rooney PC (57) ABSTRACT

Exemplary systems and methods for adjusting current values in a fuel cell system for producing electricity with fuel cells, include drawing major part of the current from at least one serial connection. An adjusting circuit adjusts current values by drawing or supplying current of at least one stack of individual fuel cell stacks or current of at least one group of the groups of stacks within the serial connection. The adjusting circuit is integrated with the at least one stack of individual fuel cell stacks or with the at least one group of the groups of stacks. Compensation current of the at least one stack or group is a small percentage of a major part of the current in the serial connection of stacks.

11 Claims, 5 Drawing Sheets

(51) Int. Cl.
*H01M 8/24* (2016.01)
*H01M 8/04* (2016.01)
*H02J 7/00* (2006.01)
*H01M 8/12* (2016.01)

(52) U.S. Cl.
CPC ............. *H01M 2008/1293* (2013.01); *H02J 2007/0067* (2013.01); *Y02E 60/50* (2013.01); *Y02E 60/525* (2013.01); *Y10T 307/685* (2015.04); *Y10T 307/702* (2015.04)

(56) References Cited

U.S. PATENT DOCUMENTS

| | | |
|---|---|---|
| 2002/0177018 A1 | 11/2002 | Fuglevand |
| 2002/0177021 A1* | 11/2002 | Fuglevand ............ 429/23 |
| 2002/0190692 A1 | 12/2002 | Marten |
| 2004/0048112 A1 | 3/2004 | Halme et al. |
| 2006/0152085 A1 | 7/2006 | Flett et al. |
| 2010/0090649 A1 | 4/2010 | Sardat et al. |
| 2010/0248055 A1 | 9/2010 | Imanishi et al. |
| 2010/0295383 A1* | 11/2010 | Cummings ............ 307/151 |

FOREIGN PATENT DOCUMENTS

| | | |
|---|---|---|
| JP | 2005527943 A | 9/2005 |
| JP | 2009-129783 A | 6/2009 |
| WO | 2008112219 A1 | 9/2008 |
| WO | 2008/139103 A2 | 11/2008 |

OTHER PUBLICATIONS

First Notification of Office Action issued on Jan. 13, 2014, by the State Intellectual Property Office of China in corresponding Chinese Patent Application No. 201080030543.8, and an English Translation of the Office Action. (14 pages).

International Search Report (PCT/ISA/210) issued on Aug. 23, 2010, by European Patent Office as the International Searching Authority for International Application No. PCT/F12010/050440.

Finnish Search Report for FI 20095775 dated Apr. 28, 2010.

A. DeBernardinis et al., "Fuel cells multi-stack power architectures and experimental validation of 1 kW parallel twin stack PEFC generator based on high frequency magnetic coupling dedicated to on board power unit", Energy Conversion and Management, Aug. 1, 2008, pp. 2367-2383, vol. 49, No. 8.

M. Shen et al., "Multi-Level DC/DC Power Conversion System with Multiple DC Sources", Power Electronics Specialists Conference, Jun. 17, 2007, pp. 2008-2014.

* cited by examiner

12 # METHOD AND ARRANGEMENT FOR IMPROVED CONTROLLABILITY OF FUEL CELL STACKS

RELATED APPLICATIONS

This application claims priority as a continuation application under 35 U.S.C. §120 to PCT/FI2010/050440, which was filed as an International Application on May 31, 2010 designating the U.S., and which claims priority to European Patent Application No. 20095775 filed in Finland on Jul. 8, 2009, the entire contents of which are hereby incorporated by reference in their entireties.

FIELD

The disclosure is related to a fuel cell, such as a fuel cell device for controlling fuel cell stacks.

BACKGROUND INFORMATION

Because of environmental concerns, new energy sources, that are environmentally friendly and having good efficiency, have been developed. Fuel cell devices are promising future energy conversion devices by means of which fuel, for example bio gas, is directly transformed to electricity via a chemical reaction in an environmentally friendly process.

Figure 1:
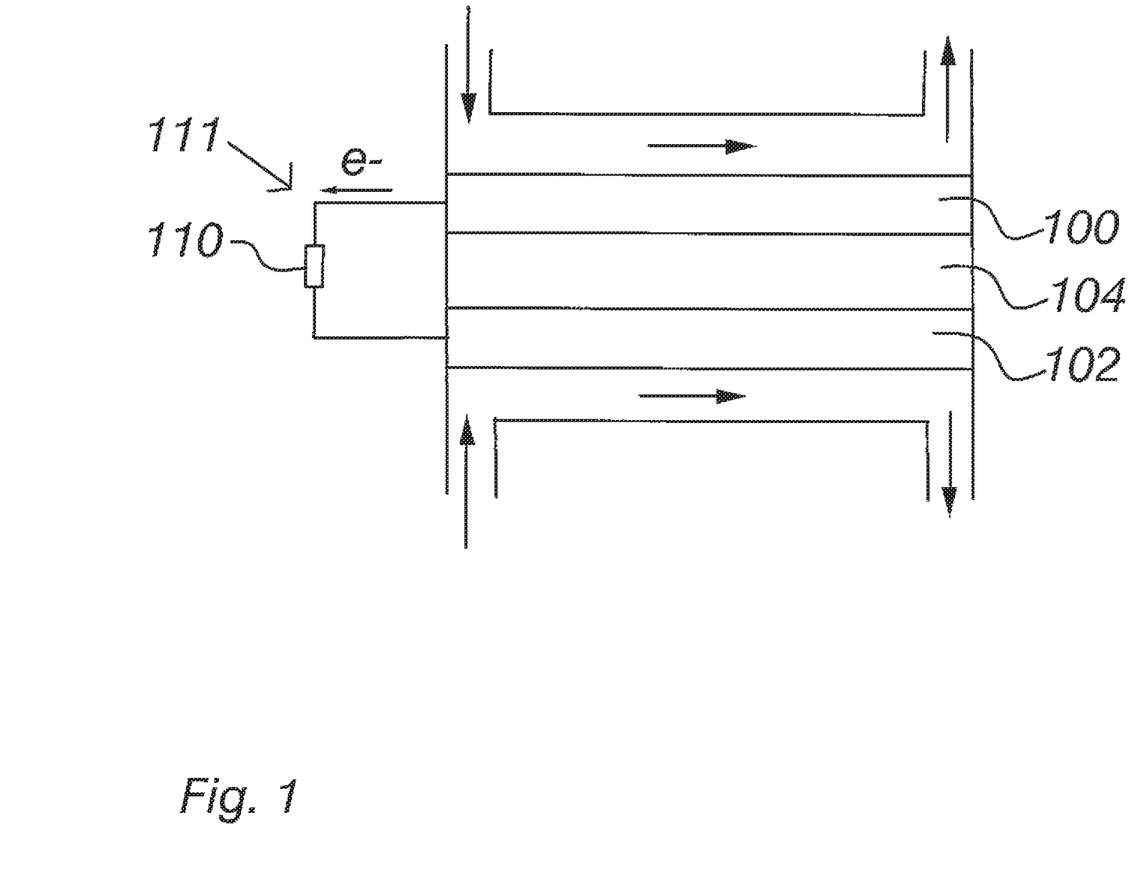
FIG. 1 illustrates a single fuel cell structure in accordance with a known device.

FIG. 1 illustrates a single fuel cell structure in accordance with a known device. Fuel cell, as presented in FIG. 1, includes an anode side 100 and a cathode side 102 and an electrolyte material 104 between them. In solid oxide fuel cells (SOFCs), oxygen is fed to the cathode side 102 and it is reduced to a negative oxygen ion by receiving electrons from the cathode. The negative oxygen ion goes through the electrolyte material 104 to the anode side 100 where it reacts with the used fuel producing water and carbon dioxide ($CO_2$). Between the anode 100 and the cathode 102 is an external electric circuit 111 comprising a load 110 for the fuel cell.

Figure 2:
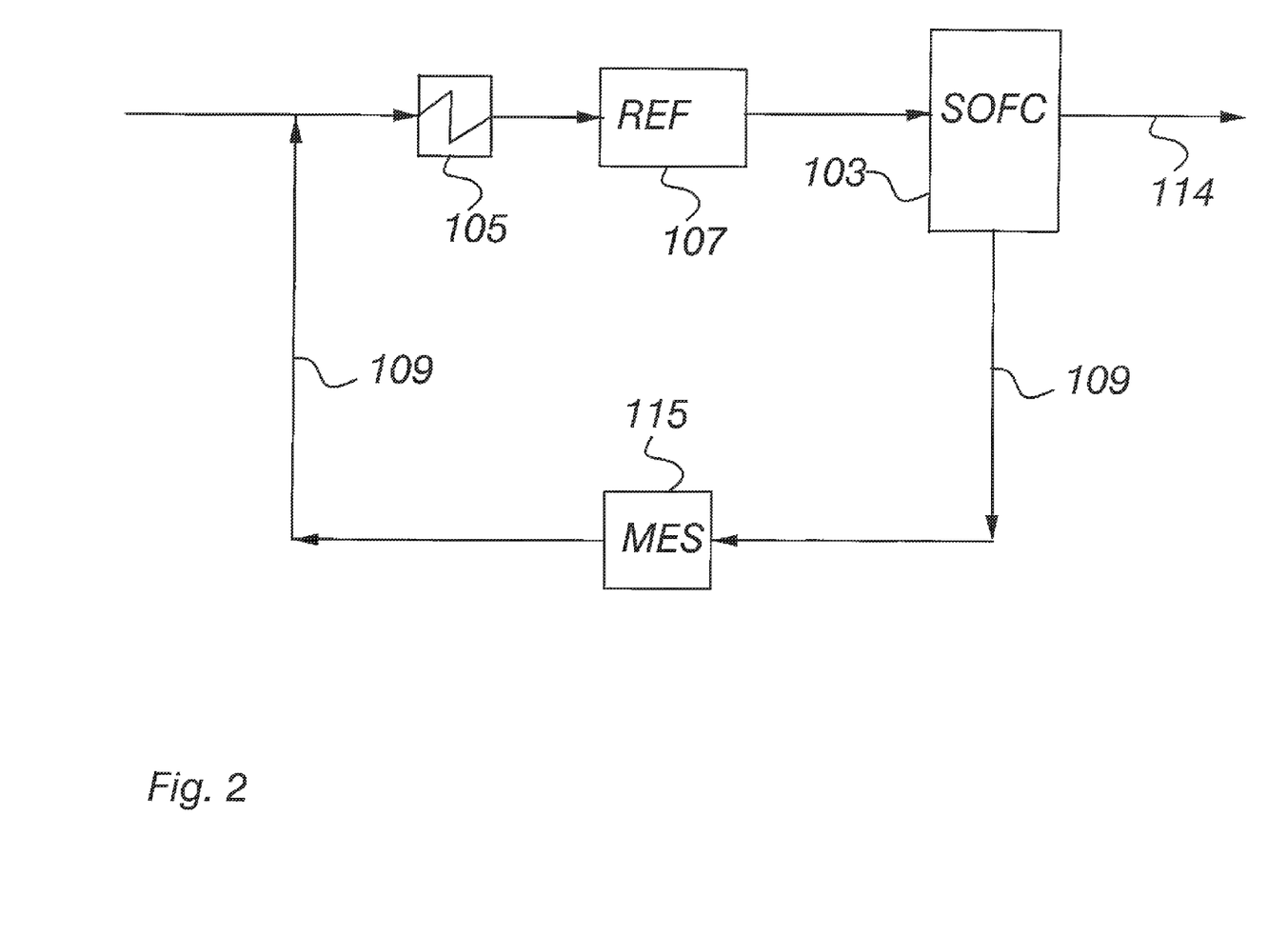
FIG. 2 illustrates an example of a SOFC device in accordance with a known implementation.

FIG. 2 illustrates an example of a SOFC device in accordance with a known implementation. As shown in FIG. 2, an SOFC device is used as a high temperature fuel cell device. SOFC devices can utilize for example natural gas, bio gas, methanol, or other compounds containing hydrocarbon mixtures as fuel. The SOFC device system in FIG. 2 can include multiple fuel cells in one or more stack formation 103 (SOFC stack(s)). A larger SOFC device system includes many fuel cells in several stacks 103, where each fuel cell has anode 100 and cathode 102 structures. Part of the used fuel may be recirculated in feedback arrangement 109. SOFC device in FIG. 2 also includes a fuel heat exchanger 105 and a reformer 107. Heat exchangers are used for controlling thermal conditions in the fuel cell process and there can be more than one of them in different locations of a SOFC device. The extra thermal energy in circulating gas is recovered in one or more heat exchangers 105 to be utilized in the SOFC device or externally. Reformer 107 is a device that converts the fuel such as for example natural gas to a composition suitable for fuel cells, for example to a composition containing all or at least some of the following: hydrogen, methane, carbon dioxide, carbon monoxide, inert gases and water. Anyway in each SOFC device it is though not necessary to have a reformer.

By using measurement means 115 such as fuel flow meter, current meter and temperature meter measurements for the operation of the SOFC device are carried out. Only part of the gas used at the anodes 100 is recirculated in the feedback arrangement 109 and the other part of the gas is exhausted 114 from the anodes 100.

A solid oxide fuel cell (SOFC) device is an electrochemical conversion device that produces electricity directly from oxidizing a fuel. Advantages of SOFC device include high efficiencies, long term stability, low emissions, fuel versatility and cost. The main disadvantage is the high operating temperature which results in long start up times and both mechanical and chemical compatibility issues.

Fuel cell systems have the potential to significantly exceed the electrical and CHP (Combined production of Heat and Power) efficiency of traditional energy production technologies of comparable size. Fuel cell systems are widely appreciated as a key future energy production technology.

In order to maximize the performance and lifetime of fuel cell systems accurate control of the operating conditions for fuel cells is specified. Fuel cells produce DC current. In higher power systems, AC output is desired and thus a power conversion from DC to AC is specified. To allow for practical interfacing and current collection from the fuel cells and subsequent power conversion, the fuel cells are manufactured as stacks containing several series connected individual cells.

In fuel cell systems having several stacks, the electrical interconnection topology of the stacks is a key design parameter. Series connection of several stacks provides for lower cabling and power conversion losses as well as lower cost for components. However, a setback is that all stacks in the series will have the same current. Ideally, when all stacks are identical and their operating conditions are fully equal, this is not an issue. However, in a practical system there will always be some variations in temperature, fuel flow and characteristics of the stacks. In particular in systems designed to allow for replacement of individual stacks there may be significant variations between stacks due to age differences. When dissimilar stacks are placed electrically in series, their current can be limited according to the worst performing stack in the series. Thus the fuel cell system loses the potential performance of the healthier stacks.

Electrical parallel connection of stacks is problematic particularly in high temperature fuel cell systems due to the intrinsic negative temperature coefficient of their internal resistance. This characteristic gives rise to issues with uneven current sharing even when strings of several series connected stacks are connected in parallel. To avoid the current sharing issues, separate converters for each stack are often used and this brings additional cost to the system.

Finnish patent publication FI118553 B1, discloses a biocatalytic fuel cell arrangement where fuel cells are connected in parallel or in series. This arrangement includes controllable switches that are controlled by using a control circuit so that the switches change cyclically to and from conducting state as an object to increase the output voltage of the biocatalytic fuel cell arrangement. FI118553 B1 does not present a solution to the described problem of dissimilar stacks placed electrically at least in serial connection where their current has to be limited according to the worst performing stack in the series. In addition, FI118553 B1 does not include an embodiment where stacks can be individually measured and adjusted to avoid the dissimilarity problems between the stacks in serial connection.

SUMMARY

An exemplary arrangement for adjusting current values in a fuel cell system for producing electricity with fuel cells is disclosed, wherein each fuel cell in the fuel cell system includes an anode side, a cathode side, an electrolyte between the anode side and the cathode side, and at least two electrically serial connected individual fuel cell stacks or groups of stacks, each stack having at least one fuel cell, the arrangement for adjusting current values in the fuel cell system comprising: means for drawing major part of the current from the at least one serial connection; at least one adjusting circuit for adjusting current values by drawing or supplying current of at least one stack of said individual fuel cell stacks or current of at least one group of said groups of stacks within the serial connection including other individual fuel cell stacks or other groups of stacks to generate negative or positive compensation current; and integration means for integrating the at least one adjusting circuit with the at least one stack of individual fuel cell stacks or with the at least one group of groups of stacks for arranging individually said compensation current of said at least one stack or of said at least one group, the compensation current values being in a magnitude scale of 0-10% compared to a major part of the current in at least said serial connection of stacks, to pass via the at least one adjusting circuit, the current in the at least one individual fuel cell stack or in the at least one group of stacks being said major part of the current summed with the compensation current, wherein the at least one adjusting circuit includes means for controlling the compensation current in the at least one individual fuel cell stack or in the at least one group of stacks.

An exemplary method for adjusting current values in a fuel cell system for producing electricity with fuel cell stacks is disclosed, comprising: drawing a major part of current from at least one serial connection of individual fuel cell stacks or groups of stacks; adjusting current values by drawing or supplying current of at least one stack of said individual fuel cell stacks or at least one group of said groups of stacks within the serial connection having other individual fuel cell stacks or other groups of stacks, to generate negative or positive compensation current and by integrating at least one adjusting circuit with the at least one stack of individual fuel cell stacks or with the at least one group or groups of stacks for arranging said compensation current of said at least one individual stack or of said at least one group, the compensation current values being in a magnitude scale of 0-10% as compared to a major part of the current in said serial connection of stacks, to pass via the at least one adjusting circuit, wherein the current in the at least one individual fuel cell stack or in the at least one group of stacks being said major part of the current summed with the compensation current; and controlling the compensation current in the at least one individual fuel cell stack or in the at least one group of stacks by utilizing the at least one integrated adjusting circuit.

An exemplary system for adjusting current values in a fuel cell system for producing electricity with fuel cells is disclosed, wherein each fuel cell in the fuel cell system includes an anode side, a cathode side, an electrolyte between the anode side and the cathode side, and at least two electrically serial connected individual fuel cell stacks or groups of stacks, each stack having at least one fuel cell, the system for adjusting current values in the fuel cell system comprising: means for drawing part of the current from the at least one serial connection; at least one adjusting circuit for adjusting current values by drawing or supplying current of at least one stack of said individual fuel cell stacks or current of at least one group of said groups of stacks within the serial connection including other individual fuel cell stacks or other groups of stacks to generate negative or positive compensation current; and integration means for integrating the at least one adjusting circuit with the at least one stack of individual fuel cell stacks or with the at least one group of groups of stacks for arranging individually said compensation current of said at least one stack or of said at least one group, the compensation current values being less than 10% of a magnitude of a major part of the current in at least said serial connection of stacks, wherein to pass via the at least one adjusting circuit, the current in the at least one individual fuel cell stack or in the at least one group of stacks being said major part of the current summed with the compensation current, wherein the at least one adjusting circuit includes means for controlling the compensation current in the at least one individual fuel cell stack or in the at least one group of stacks.

BRIEF DESCRIPTION OF THE DRAWINGS

The benefit of the disclosure is that it makes possible to build economically fuel cell systems with long serial connections that may include several fuel cell stacks without loosing energy production capacity due to stack differences. These fuel cell systems also have long expected lifetimes thus increasing cost savings that are achievable by this disclosure.

DETAILED DESCRIPTION

Exemplary embodiments of the present disclosure are directed to a fuel cell system where many fuel cells can be serially connected so that the loading of fuel cell stacks in a fuel cell system can be actively optimized and a lifetime for each fuel cell can be made longer and thus the lifetime for the whole fuel cell system can be made even substantially longer. This can be achieved by an arrangement for adjusting current values in a fuel cell system for producing electricity with fuel cells, each fuel cell in the fuel cell system comprises an anode side, a cathode side and an electrolyte between the anode side and the cathode side, and the fuel cell system includes at least two electrically serial connected individual fuel cell stacks or groups of stacks, each stack including at least one fuel cell. The arrangement for adjusting current values in the fuel cell system has means for drawing the major part of the current from the at least one serial connection, at least one adjusting circuit for adjusting current values of the individual fuel cell stacks or groups of stacks within the serial connection, integration means for integrating the at least one adjusting circuit with the individual fuel cell stacks or groups of stacks for arranging a small compensation current, compared to the major part of the current, to pass via the at least one adjusting circuit, and the at least one adjusting circuit includes means for controlling the small compensation current in the at least one fuel cell stack.

Exemplary embodiments of the present disclosure also include a method for adjusting current values in a fuel cell system for producing electricity with fuel cell stacks. In the method, the adjustment of the current values is accomplished by drawing the major part of the current from at least one serial connection of individual fuel cell stacks or groups of stacks, by adjusting current values of the individual fuel cell stacks or groups of stacks within the serial connection by integrating at least one adjusting circuit with the individual fuel cell stacks or groups of stacks for arranging a small compensation current, compared to the major part of the current, to pass via the at least one adjusting circuit, and by controlling the small compensation current in the at least one fuel cell stack by utilizing the at least one integrated adjusting circuit.

Exemplary embodiments disclosed herein are directed to at least one adjusting circuit being integrated with at least one fuel cell stack that is at least serially connected to at least one other fuel cell stack. This integration is arranged so that a small current passes via the at least one adjusting circuit as compared to a current in the serial connection of stacks. The at least one adjusting circuit senses voltage or current values in the at least one fuel cell stack, that is integrated with the at least one adjusting circuit, and the at least one adjusting circuit is arranged to adjust current values in the at least one fuel cell stack based on the sensed voltage or current values.

Exemplary embodiments of the present disclosure can avoid the shortcomings of serially and parallel connected stacks through means for arranging limited current adjustability of stacks within a serially and/or parallel connected group. This feature is made possible by the introduction of substantially small current adjusting circuits in relation to fuel cell stacks. These adjusting circuits are capable of drawing or supplying a limited current from stack or to stack, this stack being serially and/or parallel connected to other stacks.

Figure 3:
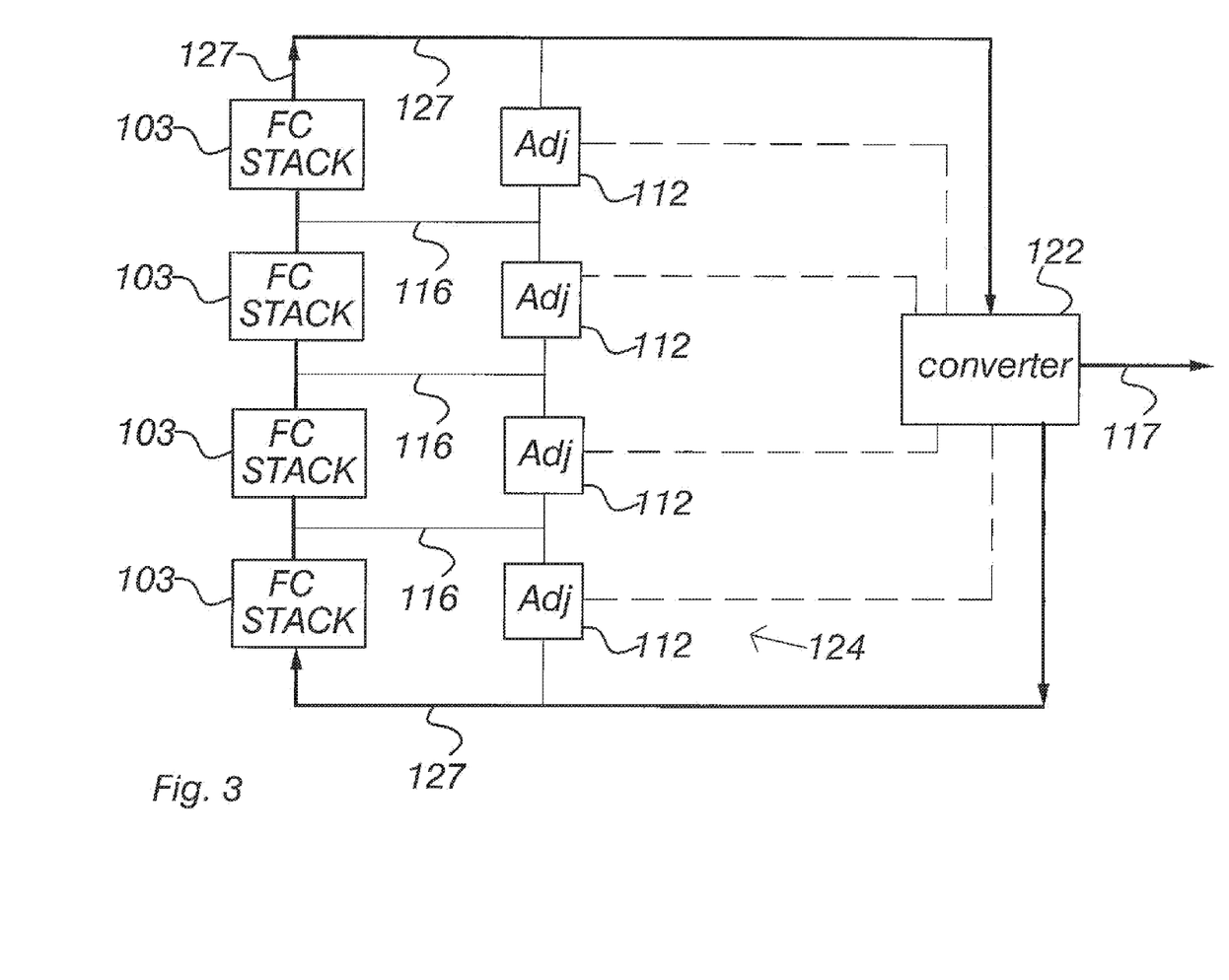
FIG. 3 illustrates an exemplary embodiment in accordance with the present disclosure.

FIG. 3 illustrates an exemplary embodiment in accordance with the present disclosure. As shown in FIG. 3, this fuel cell device includes several fuel cell stacks 103 that are serially connected and the groups of serially connected fuel cell stacks 103 are parallel connected. Although the embodiment in FIG. 3 includes only four fuel cell stacks 103 in serial connection, there can be many more fuel cell stacks in serial connection and this group of serially connected stacks 103 can be in parallel connection to one or more other group(s) of serially connected stack(s). The currents of serially connected stacks 103 are individually and actively controlled within certain bounds by means of stack specific current adjusting circuits 112, which draw or supply a compensation current. Each stack 103, or for two stacks, includes an individual stack specific current adjusting circuit 112 that is capable of drawing or supplying a limited current from stack or to stack that is serially connected to other stacks in the group of serially connected stacks. In other words, for each stack 103, an individual and active load control is arranged by integrating at least one adjusting circuit 112 with each stack to keep load conditions optimal despite of stack differences in the process for producing electricity with fuel cells. This arrangement can also include a converter 122, for example a DC-AC converter. Means 127, 122 draw the major part of the current from the serial connection of the stacks 103. Arrow 117 describes a power output from the converter 122, for example AC power output from the DC-AC converter. Also a converter 122 can be for example a dc-dc converter and such that the output power 117 is dc power.

The construction and dimensioning of the adjusting circuits 112 is such that they are capable of compensating for the differences between stacks 103 by adjusting individually optimal current for each stack in the serially and/or parallel connected configuration including many stacks. In an exemplary embodiment of the disclosure, this construction leads, for example, to a 5-10% compensation scale of the nominal stack 103 current. Hence, the stack current still flows in the main current cabling 127, whereas, compared to the stack current, a maximum of, for example, 5-10% compensation scale current passes via the adjusting circuits 112 and related cabling 116. Compensation scale current values are often less than the 5-10% compensation scale current maximum values. Adjusting circuits 112 can allow bidirectional current flow. This means that the effect of the compensation scale current value to the main path current makes the stack current vary, for example, between 90%-110% from the average main path current value. These changes are often between narrower scale, for example between 97%-103%, the compensation scale current maximum value being then 3% compared to the average main path current value. Adjusting circuits 112 can also be limited to one-directional current flow. This means that the effect of the compensation scale current value to the main path current makes the stack current vary for example between 90%-100%, or 100%-110%, from the average main path current value.

Since, in the exemplary embodiments according to the disclosure, only a small part of the total fuel cell stack power passes through the adjusting circuits 112, related cabling to the adjusting circuits may be smaller and power conversion efficiencies for the adjusting circuits may be substantially lower than for the main power path without sacrificing the overall efficiency. This makes possible low cost implementation of the adjusting circuits 112 and related cables 116. Since, in the exemplary embodiment of the disclosure, the topology depending voltage over the adjusting circuit 112 is only that of one or two stacks 103, low voltage and high frequency components can be used to yield very compact circuits. The integration of the adjusting circuits 112 with fuel cell stacks 103 is accomplished with integration means 116, 124, which include for example existing means 124 for measuring voltage of stacks by using same cables 116 and circuit boards 124 thus again achieving cost savings. Means for measuring, for example, means 124 for sensing voltage of fuel cell stacks 103 produce control signals that are utilized by adjusting circuits 112 to individually adjust an optimal current for each fuel cell stack. This integration can also be accomplished so that exemplary embodiments use the existing data cabling 116 in the fuel cell system for relaying measurement and control signals.

Exemplary embodiments can include various possibilities in implementing adjusting circuits 112.

Figure 4:
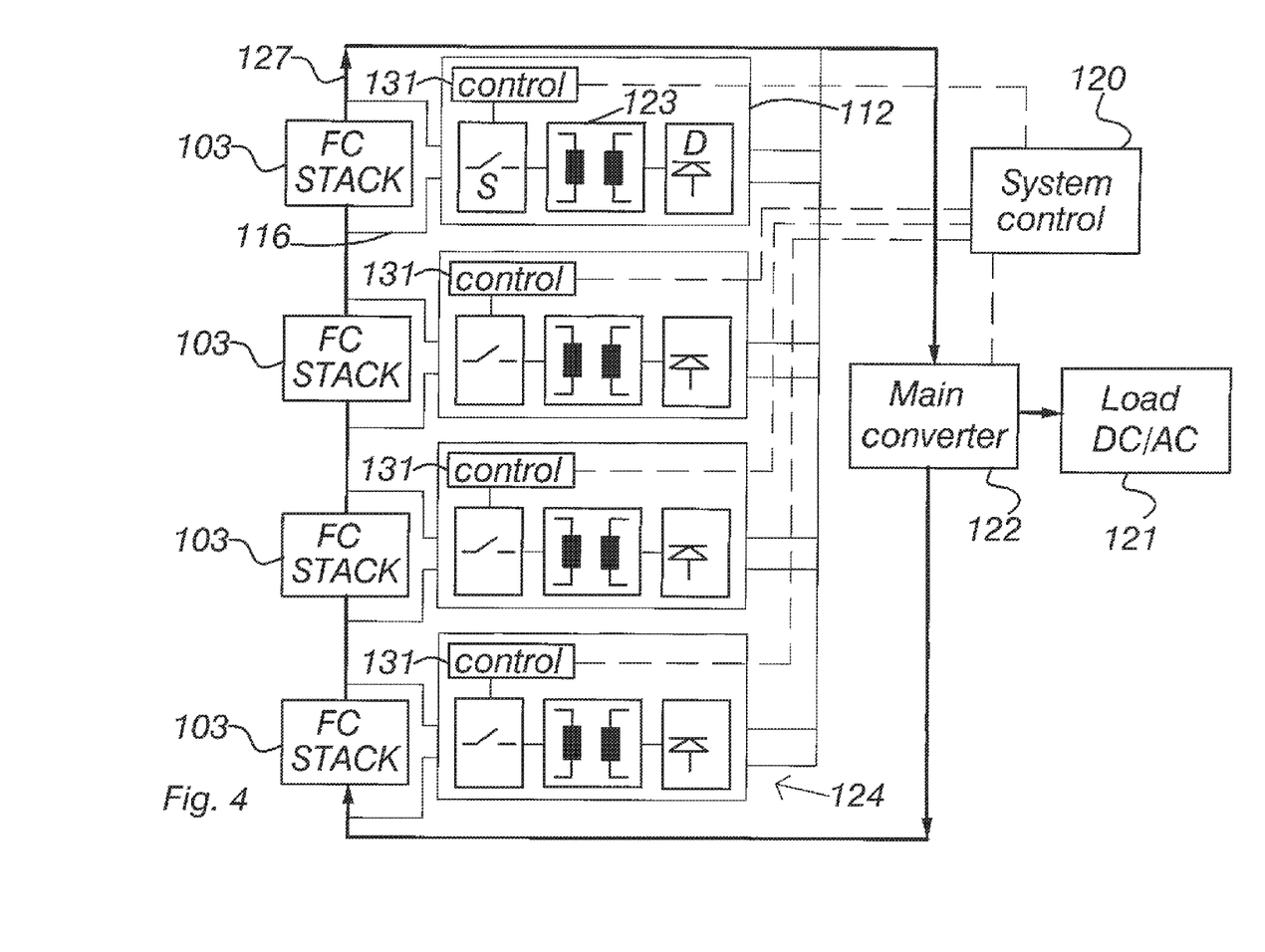
FIG. 4 illustrates a first adjusting circuit in accordance with an exemplary embodiment.

FIG. 4 illustrates a first adjusting circuit in accordance with an exemplary embodiment. As shown in FIG. 4, first adjusting circuits 112, include an isolated high-frequency transformer arrangement (e.g., forward, flyback, push-pull, full-bridge arrangement). This arrangement has integration means 124 dc-dc converters 123 as an isolation stage, controllable switches S, diodes D as a rectification stage and control means 131 to control switches for integrating the adjusting circuits individually with serially connected fuel cell stacks to allow a small compensation current, compared to the major part of the current in the major current cabling 127, to pass via the adjusting circuits 112 and related cabling 116. A voltage of each fuel cell stack is measured by means for sensing voltage values to produce control signals. The controlling of switches S to open or closed positions is operated with control means 131 associated near each switch S to individually adjust current of each fuel cell stack 103. This can be described as low level control of switches S and can be separately arranged as upper level control of switches S by a system control 120 for providing current set points for the control means 131. The system control 120 can be, for example, a programmable logic controller (PLC). Switches S can be a bipolar- or FET-transistor or any other suitable transistor switch as desired. The arrangement of FIG. 4 can also include a main dc-dc converter 122 that is connected to the load circuitry comprising DC-AC converter 121. Means 127, 121, 122 draw the major part of the current from the serial connection of the stacks 103.

Figure 5:
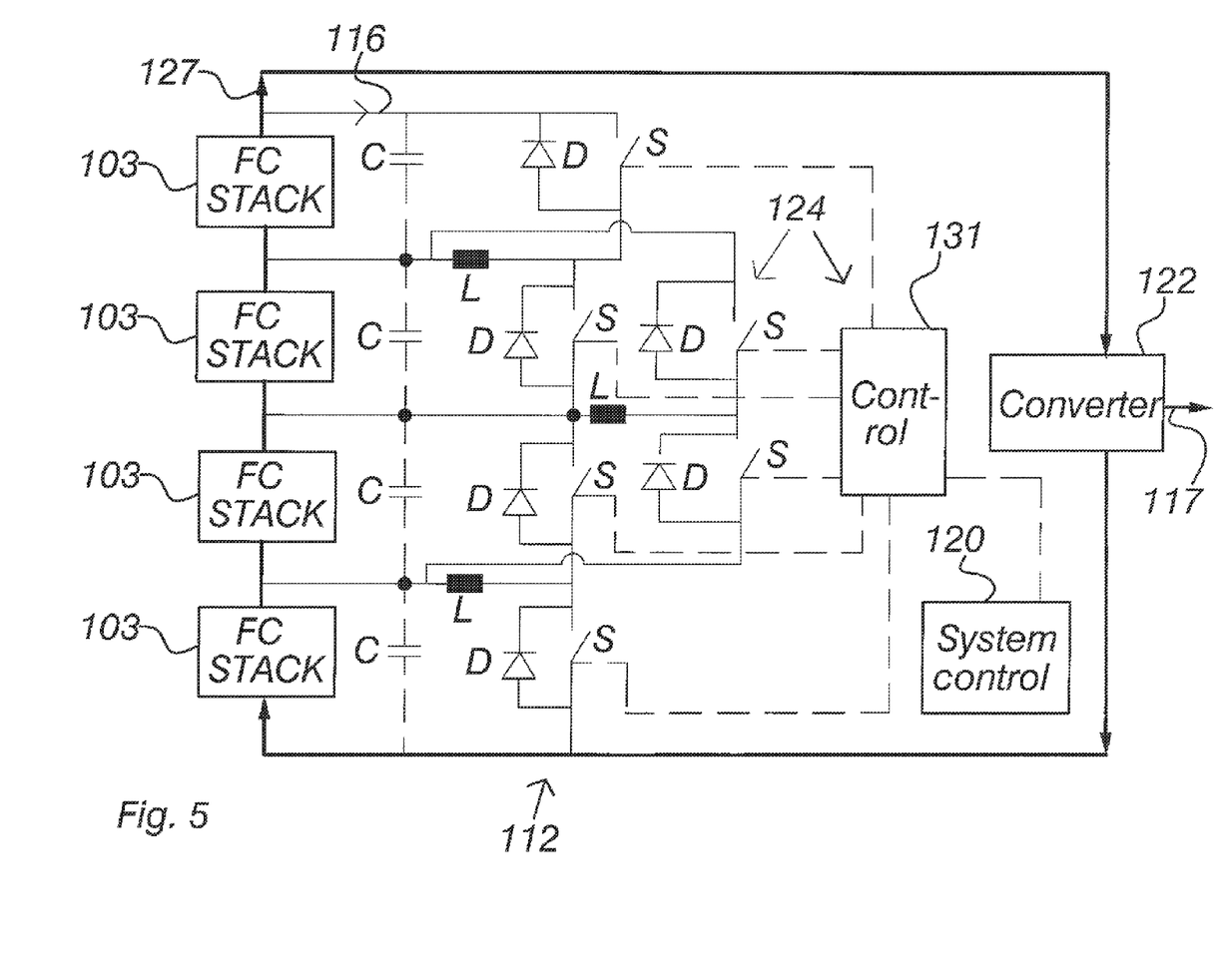
FIG. 5 illustrates a second adjusting circuit in accordance with an exemplary embodiment.

FIG. 5 illustrates a second adjusting circuit in accordance with an exemplary embodiment. As shown in FIG. 5, second adjusting circuits 112 can include a non-isolated cascaded arrangement that is implemented for example so that it has integration means 124 as a circuitry arrangement. These integration means 124 have coils L, switches S in parallel connections to diodes D, and capacitors C in parallel connections to individual fuel cell stacks, though capacitors are not necessary. By these integration means, adjusting circuits are integrated individually with serially connected fuel cell stacks to allow a small compensation current to the adjusting circuit cabling 116, compared to the major part of the current in the major current cabling 127, to pass via the adjusting circuits. A voltage of each fuel cell stack is measured by means 124 for sensing voltage values to produce control signals. The system control 120, that is for example a programmable logic controller (PLC), utilizes the control signals in controlling switches S to open or closed positions to individually adjust current of each fuel cell stack 103. Switches S can be bipolar- or FET-transistor or any other transistor switch as desired. The arrangement of FIG. 5 also includes a converter 122 that is for example a DC-AC converter. Means 127, 121 draw the major part of the current from the serial connection of the stacks 103. Arrow 117 describes the AC power output from the DC-AC converter 122.

Adjusting circuits 112 can also be implemented for example with topologies where the adjusting current is injected directly to e.g. the input of the main power converter 121. As adjusting circuits 112 allow bidirectional power flow, the currents through the adjusting circuits can be kept at minimum levels. Because of this cabling losses are low and high power conversion efficiency for every main current path is achieved. The benefits of serial connection and individual stack 103 loading can be combined by allowing for low losses in the main current path and power converter while having the possibility to individually adjust stack currents to compensate for uneven fuel flow and/or aging phenomena, for example. As only a small fraction of the total current passes through the adjusting circuits 112, the disclosure allows for a low cost and compact implementation of the circuitry. Also, a single power converter 121 can be used for the main power conversion. Current sharing issues in parallel connections can to an extent be mitigated due to the possibility of controlling individual stack currents.

The system control 120 and the control means 131 can include different kinds of analogical and/or digital electronics implementations that are for example programmable processor based. The control means 131 can also include different kind of measuring arrangements to sense voltage and/or current values for producing the control signals to switches S.

As well as described with SOFCs, exemplary embodiments of the present disclosure can also be utilized with MCFCs (Molten Carbonate Fuel Cells) and other fuel cells. MCFCs are high temperature fuel cells that use an electrolyte composed of a molten carbonate salt mixture suspended in a porous, chemically inert ceramic matrix. Also the fuel cell system, where this disclosure is utilized, does not need to have a feedback arrangement though the feedback arrangement is described in SOFC device example in FIG. 2.

Although the disclosure has been presented in reference to the attached figures and specification, the disclosure is by no means limited to those, as the disclosure is subject to variations within the scope allowed for by the claims.

Thus, it will be appreciated by those skilled in the art that the disclosed embodiments can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An arrangement for adjusting current values of fuel cells in a fuel cell system for producing electricity with fuel cells, wherein each fuel cell in the fuel cell system includes an anode side, a cathode side, an electrolyte between the anode side and the cathode side, wherein the fuel cell system includes at least two electrically serial connected individual fuel cell stacks or groups of stacks, each stack having at least one fuel cell, the arrangement for adjusting current values in the fuel cell system comprising:

cabling for drawing a first current from the serial connection wherein the first current will be a major part of current of said serial connection;

at least one adjusting circuit for adjusting the current of said serial connection by drawing or supplying a negative or positive compensation current from the fuel cell stacks or groups of stacks within the serial connection; and a cabling connection for integrating the at least one adjusting circuit with the fuel cell stacks or groups of stacks within the serial connection for arranging said compensation current, the compensation current being in a magnitude scale of 0-10% compared to values of the first current, to pass via the at least one adjusting circuit, the current of said serial connection in the at least two individual fuel cell stacks or groups of stacks being a sum of the first current and the compensation current, wherein the at least one adjusting circuit includes switch converter circuitry for controlling the compensation current in the at least two individual fuel cell stacks or groups of stacks.

2. The arrangement in accordance with claim 1, wherein said compensation current is 0-3% compared to the first current in said serial connection of stacks.

3. The arrangement in accordance with claim 1, wherein said cabling connection for integrating the at least one adjusting circuit includes circuitry for measuring voltage of the at least two fuel cell stacks or groups of stacks by using common cables for the at least one adjusting circuit and at least one common circuit board.

4. The arrangement in accordance with claim 1, wherein the at least one adjusting circuit is an isolated high-frequency transformer arrangement.

5. The arrangement in accordance with claim 1, wherein the at least one adjusting circuit is a non-isolated cascaded converter arrangement including the switch converter circuitry for producing control signals, switches to be controlled to open and closed positions and wherein the switch converter circuitry controls the compensation current by utilizing said control signals in controlling the switches to open or closed positions to individually adjust the current of each fuel cell stack or group of stacks.

6. A method for adjusting current values of fuel cells in a fuel cell system for producing electricity with individual fuel cell stacks or groups of stacks, comprising:

drawing a first current from at least one serial connection of the individual fuel cell stacks or groups of stacks, wherein the first current will be a major part of current of said serial connection;

adjusting the current of said serial connection by drawing or supplying a positive or negative compensation current to or from at least one stack of said individual fuel cell stacks or at least one group of said groups of stacks within the serial connection having other individual fuel cell stacks or other groups of stacks, and by integrating at least one adjusting circuit with the at least one stack of individual fuel cell stacks or with the at least one group of groups of stacks for arranging said compensation current of said at least one individual stack or of said at least one group, the compensation current being in a magnitude scale of 0-10% compared to values of the first current, to pass via the at least one adjusting circuit, wherein the current of said serial connection in the at least one individual fuel cell stack or in the at least one group of stacks being said major part of the first current and is summed with the compensation current; and controlling the compensation current in the at least one individual fuel cell stack or in the at least one group of stacks by utilizing the at least one integrated adjusting circuit.

7. The method in accordance with claim 6, wherein said compensation current is 0-3% of the first current in said serial connection of stacks.

8. The method in accordance with claim 6, wherein said at least one adjusting circuit is integrated with circuitry for measuring voltage of fuel cell stacks by using common cables for said at least one adjusting circuit and at least one common circuit board as said circuitry for measuring voltage use.

9. The method in accordance with claim 6, wherein the at least one adjusting circuit is an isolated high-frequency transformer arrangement.

10. The method in accordance with claim 6, wherein control signals are produced and switches are controlled by utilizing switch converter circuitry to open and close positions on the basis of said control signals to individually adjust the current of each fuel cell stack.

11. A system for adjusting current values of fuel cells in a fuel cell system for producing electricity with fuel cells, wherein each fuel cell in the fuel cell system includes an anode side, a cathode side, an electrolyte between the anode side and the cathode side, wherein the fuel cell system includes at least two electrically serial connected individual fuel cell stacks or groups of stacks, each stack having at least one fuel cell, the system for adjusting current values in the fuel cell system comprising:

cabling for drawing part of a first current from the at least one serial connection wherein the first current will be a major part of current of said serial connection;

at least one adjusting circuit for adjusting the current of said serial connection by drawing or supplying a positive or negative compensation current from at least one stack of said individual fuel cell stacks or of at least one group of said groups of stacks within the serial connection; and a cabling connection for integrating the at least one adjusting circuit with the at least one stack of individual fuel cell stacks or with the at least one group of groups of stacks for arranging said compensation current of said at least one stack or of said at least one group, the compensation current values being 0-3% of a magnitude of the first current in at least said serial connection of stacks, wherein to pass via the at least one adjusting circuit, the current of said serial connection in the at least one individual fuel cell stack or in the at least one group of stacks being a sum of the first current and the compensation current, wherein the at least one adjusting circuit includes switch converter circuitry for controlling the compensation current in the at least one individual fuel cell stack or in the at least one group of stacks.

* * * * *